INVENTORS
JAMES G. MIDDLETON
JOHN D. PARRISH

ATTORNEYS

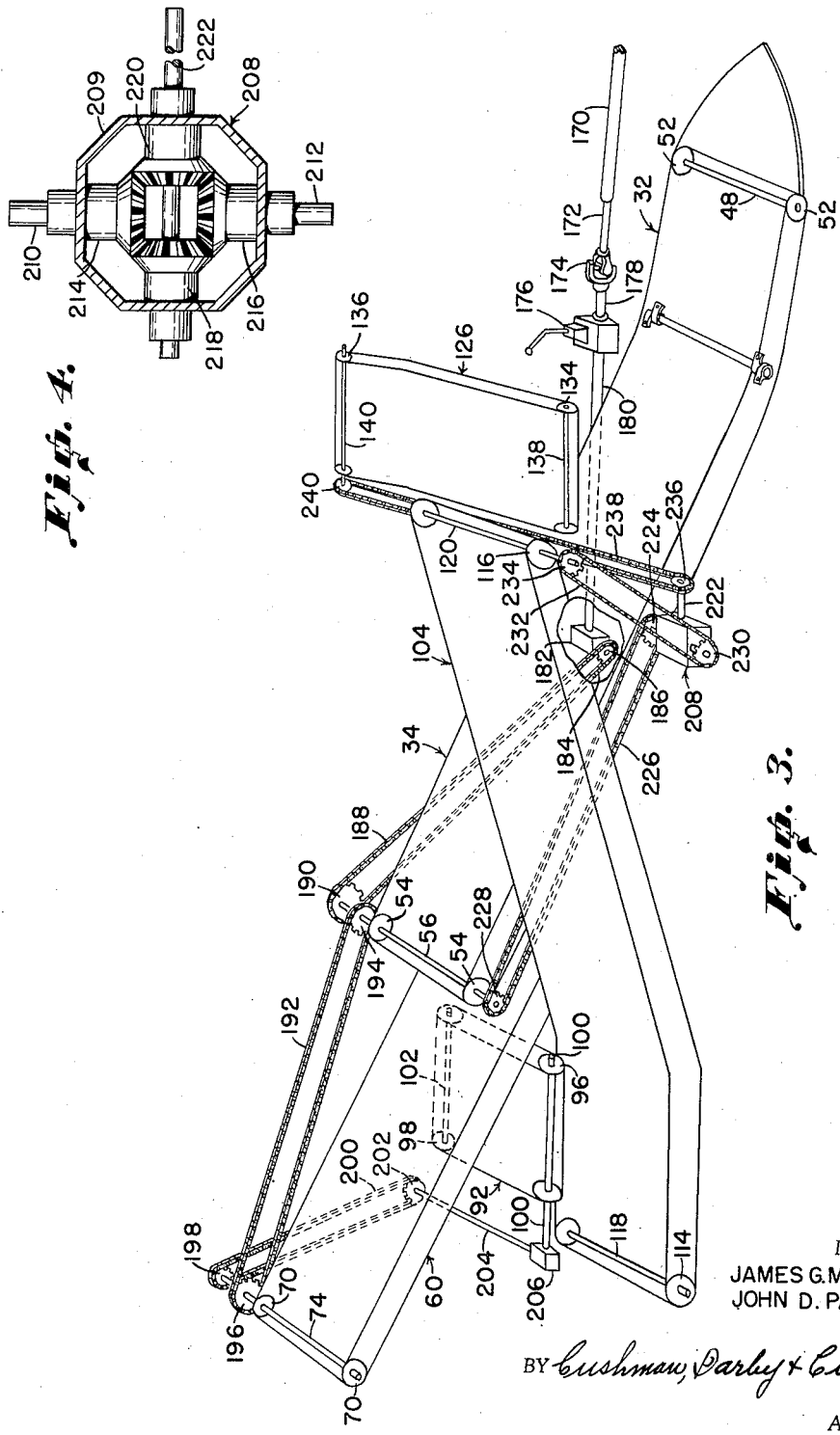

United States Patent Office 2,777,266
Patented Jan. 15, 1957

2,777,266

POTATO HARVESTER

James G. Middleton, Elkton, and John D. Parrish, St. Augustine, Fla., assignors to Middleton & Parrish, Inc., Elkton, Fla., a corporation of Florida Application February 8, 1955, Serial No. 486,908

5 Claims. (Cl. 55—51)

The present invention relates to harvesters and more particularly to an improved harvesting machine for digging, cleaning, bagging and transporting potatoes or the like.

It is an object of the present invention to provide a potato harvesting machine which is capable of digging the potatoes, loosening the soil therefrom, separating the vines therefrom, conveying them to a bagging station and then providing a platform for transporting the bagged potatoes.

Another object of the present invention is to provide a potato harvester and transporter having improved means for separating the potatoes from the adjacent soil, and their attached vines, for carrying the separated potatoes to a bagging station and for transporting the bags after they are filled with potatoes.

A still further object of the present invention is the provision of an improved devining conveyor means in a potato harvester of the type described whch functions to efficiently separate the potatoes from their attached vines, with the latter being carried away by the conveyor separately from the potatoes.

A still further object of the present invention is the provision of a potato harvesting machine which is simple but sturdy in construction, efficient in its operation and relatively economical to manufacture and maintain.

These and other objects of the present invention will become more apparent during the course of the following detailed description and appended claims.

The invention may best be understood with reference to the accompanying drawings wherein an illustrative embodiment is shown.

In the drawings:

Figure 3 is a schematic perspective view illustrating the manner in which the various conveying means of the present invention are driven; and Figure 4 is an enlarged fragmentary view showing a portion of the drive means.

Figure 1:
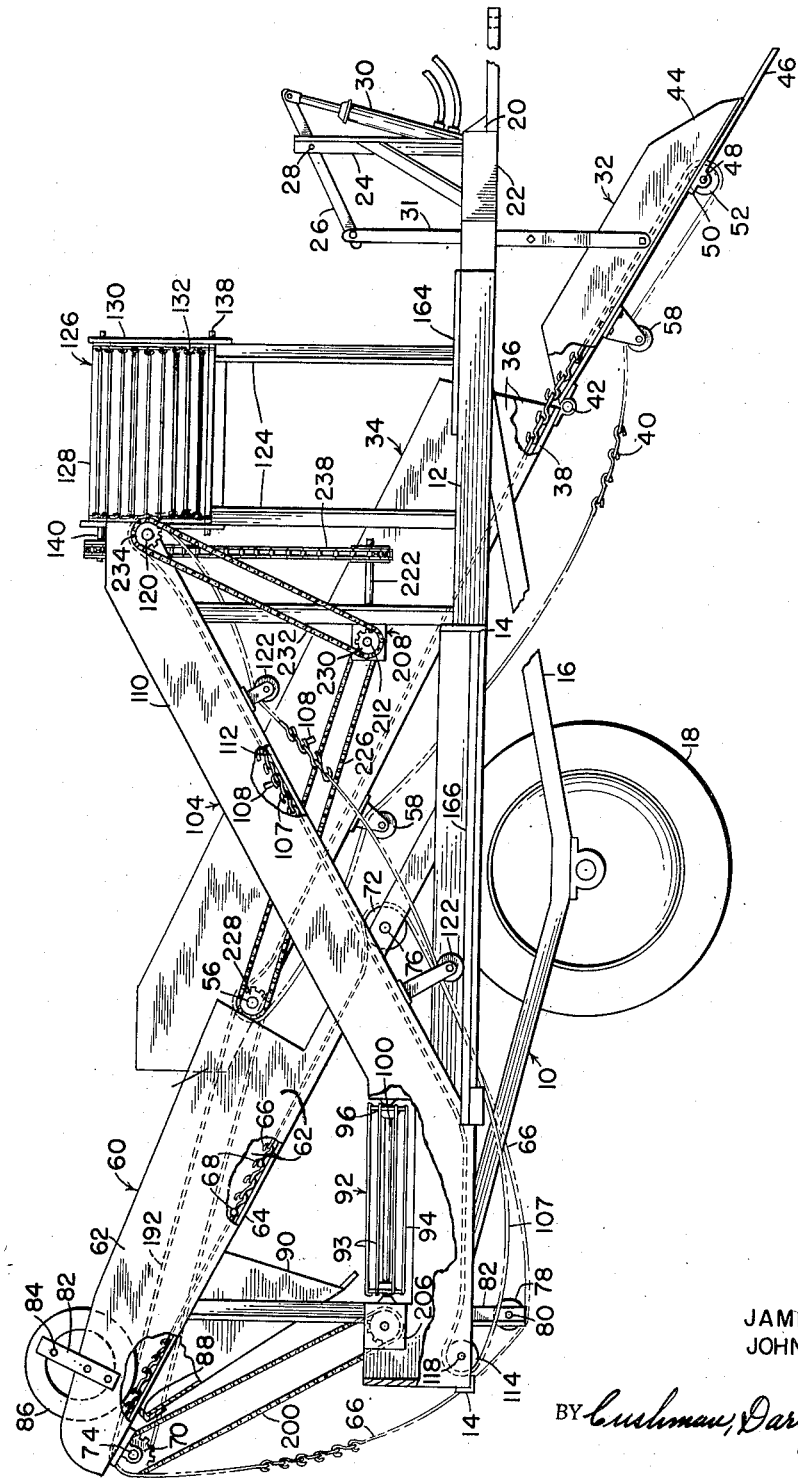
Figure 1 is a side elevational view of a potato harvesting machine embodying the principles of the present invention.

Referring now more particularly to the drawings, the potato harvesting machine of the present invention includes a main frame, generally indicated at 10, which comprises a skeletonized structure having a plurality of transversely spaced, longitudinal frame members 12 interconnected by longitudinally spaced, transverse frame members 14. Extending downwardly from the outer longitudinal frame members 12 are suitable wheel supporting sub-frames 16 upon which are mounted conventional wheels 18. A draft tongue 20 is rigidly secured at its rear end to the forward frame member 12 and extends forwardly therefrom. The forward end of the draft tongue is provided with a conventional clevis for attachment to the draw bar of a tractor or other suitable propelling vehicle. It is also to be understood that the machine of the present invention may be made a self-propelling vehicle if desired.

The draft tongue 20 is provided with suitable bracing elements 22 which extend from a point intermediate the end of the tongue to the forward frame member 14. Extending upwardly from one of the brace elements 22, is a rigid vertical post 24, on the upper end of which a bell crank 26 is pivotally mounted intermediate its ends, as at 28. A suitable actuating means, such as hydraulic ram 30, extends between the brace element 22 and the forward end of the bell crank 26 so as to pivot the latter. A connecting link in the form of a yoke 31 has its upper end pivotally connected to the rear end of the bell crank 26 and has its lower ends pivotally connected with a digging unit 32 hereinafter to be more fully described.

Disposed in the central portion of the main frame 10, is a longitudinally extending soil loosening conveyor means 34 mounted on the frame so as to extend upwardly and rearwardly therefrom. The soil loosening conveyor means 34 includes a pair of transversely spaced side rails or frames 36, each of which has an inturned lower flange 38 for supporting one end of a conventional endless chain conveyor 40 mounted for movement thereover.

The lowermost ends of the side rails 36 are provided with suitable pivot means 42 to which the rear end of the digging unit 32 is supported for vertical pivotal movement. The digging unit 32 includes a pair of transversely spaced side rails or frames 44 substantially aligned with the side rails 36 of the soil loosening conveyor means 34. Mounted between the side rails 44 and extending forwardly therefrom is a triangular digging blade 46. The forward ends of the side rails 44 are interconnected by a shaft 48 mounted in suitable bearings 50 carried by the side rails. Mounted on the shaft 48 are sprocket wheels 52 around which the forward end of the endless chain conveyor 40 is trained. The upper flight of the endless chain conveyor 40 extends upwardly and rearwardly from the sprockets 52 in engagement with the flanges 38, and is then trained about upper sprocket wheels 54 carried by a shaft 56 suitably mounted between the upper side rails 36 of the conveyor means 34. The lower flight of the endless chain conveyor 40 is preferably supported by means of rollers or sprocket wheels 58 suitably mounted in depending relation from the conveyor means 34 and digging unit 32.

Disposed rearwardly of the soil loosening conveyor means 34 in substantial alignment therewith is a devining endless conveyor means 60 which includes a pair of side rails or frames 62 having lower inturned flanges 64 arranged to support the upper flight of an endless chain conveyor 66. The endless chain conveyor 66 is of somewhat conventional construction and includes a plurality of transversely extending bars 68, spaced apart a distance sufficient to permit potatoes to fall therebetween. The upper flight of the endless chain conveyor 66 is supported at its ends by sprocket wheels 70 and 72 mounted on suitable shafts 74 and 76 respectively. The lower flight of the endless chain 66 is trained about lower rollers or sprocket wheels 78 mounted on a shaft 80 extending between a pair of spaced bars 82 depending from the main frame.

Rigidly secured to each of the side rails 62 is an upwardly extending arm 82, and a shaft 84 is mounted between the arms 82 and carries roller means, preferably in the form of hubless rubber tires 86. The rubber tires 86 are mounted side by side on the shaft 84 so that their inner peripheries are in rolling contact therewith. The lower surfaces of the tires are spaced just above the conveyor bars of the upper flight of the endless chain conveyor 66 so that any potatoes that are suspended or supported on top of the bars by their attached vines will be pushed or forced between the bars. Positioned just to the rear of the tires and spaced below the bars of the upper flight of the chain conveyor is a transverse member 88 forming the upper edge of a downwardly and forwardly inclined chute 90. The member 88 is spaced below the bars of the chain a distance sufficient to engage the vine suspended potatoes forced between the conveyor bars so as to free the potatoes from their attached vines. Disposed on the main frame below the devining conveyor means 60 and arranged to receive the potatoes issuing from the chute 90, is a lower transverse endless conveyor means 92 having a plurality of relatively closely spaced, transverse bars 93 interconnected together to form an endless chain conveyor 94. The endless chain conveyor 94 is trained about spaced sprocket wheels 96 and 98 mounted on shafts 100 and 102 respectively mounted between side rails 103.

Disposed adjacent one side of the soil loosening and devining conveyor means and arranged to receive the potatoes issuing from the lower transverse conveyor means 92, is an upwardly and forwardly inclined endless conveyor means 104, constructed in the conventional manner of a plurality of loosely interconnected transverse bars 106 spaced relatively close together to form an endless chain conveyor 107. Extending upwardly from selected ones of the bars are plate elements 108 which are arranged to prevent the potatoes from moving downwardly during their travel on the conveyor in an upward direction. The upwardly and forwardly inclined conveyor means 104 includes the usual pair of transverse side rails 110 having lower inturned flanges 112 for supporting the bars 106. The upper flight of the conveyor means is supported at its ends by a pair of spaced sprocket wheels 114 and 116 mounted on shafts 118 and 120 respectively carried by side rails 110. The lower flight of the endless chain is supported by a pair of spaced rollers or sprockets 122 suitably mounted in a depending relation from the side rails 110.

Supported on a suitable subframe 124 extending upwardly from the main frame 10 in a position to receive the potatoes issuing from the upwardly and forwardly inclined conveyor means 104, is an upper transverse conveyor means 126 constructed in the same manner as that of conveyor means 104 so as to include an endless chain conveyor 127 having a plurality of spaced, interconnected transverse bars 128, side rails 130 having inturned flanges 132, and spaced supporting sprocket wheels 134 and 136 mounted on shafts 138 and 140 respectively.

Figure 2:
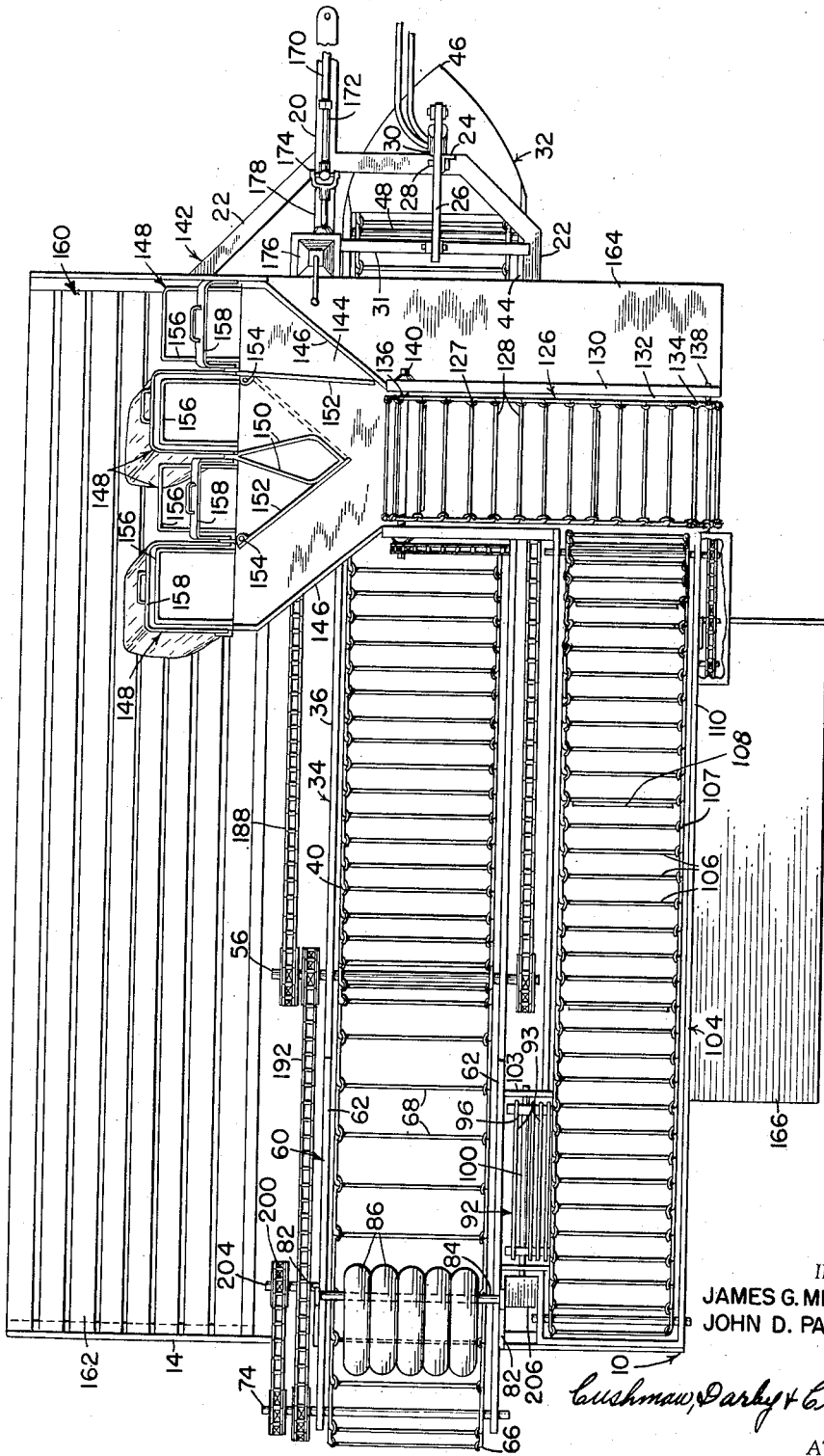
Figure 2 is a top plan view of the machine shown in Figure 1.

Supported on the discharge end of the conveyor means 126 on subframe structure 124 is a bag securing means, generally indicated at 142, which includes a trapezoidal plate 144 extending downwardly and outwardly from the conveyor means 126. A pair of outwardly diverging side walls 146 extend upwardly from the sides of the plate 144. A plurality of bag holding devices 148 are supported adjacent the outer lower edge of the horizontal plate and a central dividing wall 150 divides the outer edge of the plate into two compartments. Intermediate each of the compartments, a swingable gate or wall 152 is pivotally mounted on a pivot pin 154 adjacent the outer end of the plate. As shown in Figure 2, each swingable wall or gate 152 is movable between two positions wherein either half of the adjacent compartment may be opened while the other is closed.

Each of the bag holding devices 148 includes a peripheral ring 156 and a cooperating U-shaped strap 158 pivoted at the forward ends of its legs so as to swing into close proximity to the outer surface of the associated ring 156 and engage the upper end of the bag therebetween in a substantially open condition. By providing four bag holding devices, it is possible to be feeding into two of the bags while the other two perviously filled bags are removed and empty bags are replaced thereby.

A longitudinally extending platform 160 consisting of a plurality of planks 162 supported on the main frame is provided adjacent the opposite side of the soil loosening and devining conveyor means for the purpose of transporting the filled bags and for providing a work station for the attendant whose job it is to operate the bag filling means.

Further platforms are preferably provided on the main frame to provide work stations for attendants adjacent the upper transverse conveyor means 126 and the upwardly and forwardly inclined conveyor means 104. As shown in Figure 2, a platform 164 is provided on the forward end of the main frame adjacent conveyor means 126 and a second platform 166 is provided adjacent the conveyor means 104.

Referring now more to Figure 3, there is shown a preferred arrangement for driving the various conveyor means of the present machine. It will be understood that the main source of power is preferably derived from the conventional power take-off of the propelling tractor (not shown) but that power could be supplied by the wheels of the main frame or by a suitable power plant carried by the main frame. As shown in Figure 3, the driving arrangement includes a hollow square shaft 170 which extends from the power take-off of the tractor. Slidably mounted within the hollow square shaft 170, is one end of a square shaft 172, the other end of which is connected with a universal joint 174. A clutch mechanism generally indicated at 176, is connected at one side with the universal joint 174 by a stub shaft 178 and the other side has a shaft 180 leading into a gear box 182 which in turn drives a transverse stub shaft 184 carrying a sprocket wheel 186. An endless chain 188 is trained about sprocket wheel 186 and another sprocket wheel 190 mounted on one end of the shaft 56 of soil loosening conveyor means 34 so as to drive the latter.

The devining conveyor means is driven by means of an endless chain 192 trained about a sprocket wheel 194 mounted on shaft 56 adjacent sprocket wheel 190 and another sprocket wheel 196 mounted on one end of the shaft 74 of the devining conveyor means.

The lower transverse conveyor means 92 is driven from the shaft 74 by means of a sprocket wheel 198 mounted thereon adjacent the sprocket wheel 196 and a chain 200 trained thereabout and about another sprocket 202 mounted on one end of a transversely extending shaft 204 suitable journaled on the rear end of the main frame. The opposite end of the shaft 204 is connected with a gear box 206 which in turn is connected with the shaft 100 of the conveyor means 92.

The conveyor means 104 and 126 are driven from a differential gear mechanism, generally indicated at 208. As shown in Figure 4, the mechanism 208 is of somewhat conventional construction and includes a gear box 209 rotatably carrying a pair of opposed shafts 210 and 212 having bevelled gears 214 and 216 mounted thereon respectively. A transversely disposed pair of opposed bevelled gears 218 and 220 are rotatably mounted within the gear box 209 and mesh with the bevelled gears 214 and 216. A stub shaft 222 is fixedly secured to the bevelled gear 220 and extends freely through the bevelled gear 218. Power is supplied to the differential gear mechanism 208 through a sprocket wheel 224 mounted on the outer end of the stub shaft 210 and an endless chain 226 trained about the sprocket wheel 224 and another sprocket wheel 228 fixed to the shaft 56 of the soil loosening conveyor means.

The conveyor means 104 is driven off of stub shaft 212 through sprocket wheel 230 fixed to the end thereof and an endless chain 232 trained about the sprocket wheel 230 and another sprocket wheel 234 fixed to the shaft 120 of the conveyor means 104. Upper transverse conveyor 126 is driven from the stub shaft 222 by means of a sprocket wheel 236 fixed to the outer end thereof and an endless chain 238 trained about the sprocket wheel 236 and another sprocket wheel 240 fixed to one end of the shaft 140 of the conveyor means 126.

From the above, it can be seen that when the driving mechanism is appropriately connected with the power take-off of the tractor, all of the various conveyors will be driven. Control of all of the conveyors is maintained by means of the clutch mechanism 176 which may be actuated either to engage or disengage the main drive.

In operation, the digging unit 32 is initially set at a desired vertical position by actuating the hydraulic ram 30 from power derived by the tractor so as to pivot the digging unit about its pivot means 42 through the operation of the bell crank 26 and connecting yoke 31. In this manner, the digging unit 32 may be moved vertically to operate at any desired depth within the range provided. Assuming that the digging unit is in its desired operating depth, the machine is propelled forwardly by the tractor with the cutting blade 46 digging a swath of soil which includes the potatoes to be harvested. The swath of soil is directed upwardly and readwardly by the digging tool and is engaged by the endless chain 40 of the soil loosening conveyor means 34. During its movement up the conveyor means 34, a large majority of the soil and other loose foreign matter adjacent the potatoes falls between the bars of the conveyor and onto the ground by the action of the conveyor itself. When the potatoes reach the upper end of the soil loosening conveyor means 34 they are substantially free of the bulk of the surrounding soil and other loose material while a good percentage of the potatoes are still firmly attached to their vines.

The potatoes issuing from the soil loosening conveyor means 34 then fall on the devining conveyor means 60 where the loose potatoes fall directly through the widely spaced bars of the endless chain while those potatoes having their vines attached are prevented from falling between the bars because of the entanglement of the vines with the bars. As the endless chain carries these potatoes upwardly, they will be engaged by the lower surface of the rubber tires and are forced or pushed thereby between the bars. Upon further movement, the pushed through potatoes will engage the transverse member 88 and be severed from their vines which are carried rearwardly and fall by gravity from the rear of the conveyor. The potatoes engaged by the member 88 fall by gravity onto the chute 90 and are directed thereby onto the lower transverse conveyor means 92. The chain conveyor 94 carries these potatoes and the potatoes which have previously fallen through the bars of the devining conveyor transversely and delivers them to the lower end of the conveyor means 104.

The chain conveyor 107 carries the potatoes upwardly toward the forward end of the main frame with the plate elements 108 serving to prevent the potatoes from falling down the conveyor as they move upwardly. As the potatoes fall on the conveyor 107, they are generally in a relatively clean condition due to the action of the soil loosening and devining conveyor means and the fall onto conveyor means 92. However, any debris, large rocks or the like which have not been separated may be removed by an attendant standing on the platform 166 adjacent the conveyor means 104. Further inspection may be provided by an attendant stationed on the platform 164 adjacent the upper transverse conveyor means 126 which receives the potatoes from the conveyor means 104 and delivers them to the bag filling means 142. The attendant on platform 164 may also grade the potatoes according to quality by moving the better potatoes adjacent one side rail and the relatively poor potatoes adjacent the other side rail. A grading according to size may be made instead if desired.

As briefly discussed above, an attendant stationed on the platform 160 alternately directs the potatoes issuing from the conveyor means 126 into the empty bags carried by two of the bag holding devices 148, while the filled bags connected with the other two bag holding devices are removed, tied up and stored on the rear end of the platform 160. It is to be noted that by dividing the bag filling means into two main compartments, the potatoes separated during the grading procedure will be separately bagged. The two idle devices are then provided with empty bags and as soon as the other two bags are filled, the attendant shifts the position of the swingable gates 152 so as to direct the potatoes into the newly provided empty bags and close off the flow of potatoes to the filled bags. In this manner, the potatoes dug and substantially cleaned by the machine are bagged and transported as the machine progresses through the field. The platform 160 is preferably of a size and height convenient for loading the filled bags onto a truck. That is, by backing up a truck transversely to the platform 160, the latter is on the same level with the truck body so that easy loading is possible.

It is to be understood that the forms of the invention herewith shown and described is to be taken as the preferred embodiment of the same and that various changes may be made without departing from the spirit of the invention or the scope of the appended claims.

We claim:

1. In a potato harvesting machine, a pair of conveyor side rails, an endless conveyor having an upwardly and rearwardly moving upper flight supported for movement between said side rails, said conveyor including a plurality of transverse bars spaced apart sufficient to permit the passage of potatoes therebetween, a chute having a fixed upper end portion extending completely across the conveyor and spaced closely below said upper flight in operative association therewith, said chute extending downwardly and forwardly from said upper end portion, said upper flight being operable to receive vines having potatoes attached thereto and to carry the same upwardly and rearwardly toward the upper end portion of said chute and cooperating with the latter to separate the attached potatoes from their vines, the potatoes thus separated falling onto said chute while their vines are carried off by said endless conveyor.

2. A potato harvesting machine as defined in claim 1 wherein roller means is mounted above the upper flight of said conveyor for engaging the potatoes disposed above the bars thereof to push the same therethrough so as to insure that they will be engaged by the upper end portion of said chute.

3. In a potato harvesting machine, a pair of conveyor side rails, an endless conveyor having an upwardly and rearwardly moving upper flight supported for movement between said side rails, said conveyor including a plurality of transverse bars spaced apart sufficient to permit the passage of potatoes therebetween, a chute extending downwardly and forwardly from a position below the upper end of the upper flight of said conveyor, a fixed transverse member extending completely across the conveyor and disposed adjacent the upper end of said chute just below said upper flight in operative association therewith, said upper flight being operable to receive vines having potatoes attached thereto and to carry the same upwardly and rearwardly toward said member and cooperating therewith to separate the attached potatoes from their vines, the potatoes thus separated falling onto said chute while their vines are carried off by said endless conveyor.

4. A potato harvesting machine as defined in claim 3 wherein a transversely extending shaft is mounted above said upper flight in a position disposed forwardly of said fixed transverse member, and a plurality of hubless rubber tires are freely rotatably supported on said shaft.

5. A potato harvesting machine of the trail-behind type comprising a frame substantially rectangular in plan arranged to be connected at its forward end to a traction device, ground-engaging wheels mounted at the sides of said frame, a digging unit mounted below the central forward end of said frame and arranged to dig and convey potatoes rearwardly, a soil-loosening endless conveyor disposed in the central portion of said frame and extending longitudinally upwardly and rearwardly from said digging unit to receive the dug potatoes therefrom and convey them upwardly and rearwardly to break up and remove the soil therefrom, a devining endless conveyor disposed on the central rear end portion of said frame in longitudinal alignment with said soil loosening conveyor and arranged to receive said potatoes from said loosening conveyor and convey them upwardly and rearwardly, said devining conveyor having an upwardly and rearwardly moving upper flight supported for movement between a pair of side rails, said conveyor including a plurality of transverse bars spaced apart sufficient to permit the passage of potatoes therebetween, a chute extending downwardly and forwardly from a position below the upper end of the upper flight of said conveyor, a fixed transverse member extending completely across the conveyor and disposed adjacent the upper end of said chute just below said upper flight in operative association therewith, said upper flight being operable to receive vines having potatoes attached thereto and to carry the same upwardly and rearwardly toward said member and cooperating therewith to separate the attached potatoes from their vines, the potatoes thus separated falling onto said chute while their vines are carried off by said endless conveyor, a lower transverse conveyor carried by said frame beneath said chute and arranged to receive the potatoes issuing therefrom and to convey them transversely to one side of said frame, an upwardly and forwardly inclined endless conveyor disposed on one side of said frame adjacent said soil loosening conveyor and arranged to receive the potatoes from said lower transverse conveyor and convey them upwardly and forwardly, an upper transverse conveyor carried by said frame above said soil loosening conveyor and arranged to receive the potatoes from said upwardly and forwardly inclined conveyor and convey them transversely toward the opposite side of said frame, and a horizontal platform disposed on the other side of said frame and extending from the forward end to the rear end thereof, the forward end portion of said platform serving as a bag-filling station wherein the potatoes issuing from said upper transverse conveyor are bagged and the remainder of said platform serving as a means for supporting the bagged potatoes.

References Cited in the file of this patent

UNITED STATES PATENTS

| | | |
|---|---|---|
| 2,209,282 | Rodin | July 23, 1940 |
| 2,220,398 | Dreikosen | Nov. 5, 1940 |
| 2,447,399 | Dey | Aug. 17, 1948 |
| 2,468,639 | Sample | Apr. 26, 1949 |
| 2,582,872 | Krengel | Jan. 15, 1952 |